(12) United States Patent
Levin et al.

(10) Patent No.: US 8,700,533 B2
(45) Date of Patent: Apr. 15, 2014

(54) AUTHENTICATING LICENSES FOR LEGALLY-PROTECTABLE CONTENT BASED ON LICENSE PROFILES AND CONTENT IDENTIFIERS

(75) Inventors: Douglas Andrew Levin, Boston, MA (US); Ashesh C. Shah, Brookline, MA (US); Palle Martin Pedersen, Brookline, MA (US)

(73) Assignee: Black Duck Software, Inc., Brookline, MA (US)

( * ) Notice: Subject to any disclaimer, the term of this patent is extended or adjusted under 35 U.S.C. 154(b) by 1971 days.

(21) Appl. No.: 10/728,173

(22) Filed: Dec. 4, 2003

(65) Prior Publication Data

US 2005/0125358 A1 Jun. 9, 2005

(51) Int. Cl.
*G06F 21/00* (2013.01)

(52) U.S. Cl.
USPC .............. 705/59; 705/51; 705/54; 705/57; 705/58; 726/26; 726/27; 713/155; 717/177

(58) Field of Classification Search
USPC ............ 705/59; 726/2, 26; 713/155; 717/177
See application file for complete search history.

(56) References Cited

U.S. PATENT DOCUMENTS

| 5,313,616 A | 5/1994 | Cline et al. ................ 395/500 |
| 5,343,527 A | 8/1994 | Moore |
| 5,469,354 A | 11/1995 | Hatakeyama et al. |
| 5,577,249 A | 11/1996 | Califano |
| 5,765,152 A | 6/1998 | Erickson |
| 5,774,883 A | 6/1998 | Andersen et al. ............ 205/38 |
| 5,796,830 A | 8/1998 | Johnson et al. |
| 5,892,900 A | 4/1999 | Ginter et al. |
| 5,893,095 A | 4/1999 | Jain et al. |
| 5,917,912 A | 6/1999 | Ginter et al. ................ 380/24 |
| 5,958,051 A | 9/1999 | Renaud et al. ............. 713/200 |
| 6,029,002 A | 2/2000 | Afifi et al. |
| 6,035,402 A | 3/2000 | Vaeth et al. ................ 713/201 |
| 6,072,493 A | 6/2000 | Driskell et al. ............. 345/356 |
| 6,148,401 A | 11/2000 | Devanbu et al. |

(Continued)

FOREIGN PATENT DOCUMENTS

WO WO-/02/27486 4/2002

OTHER PUBLICATIONS

White et. al. "How Computers Work", Oct. 2003, Que, 7th Edition.*

(Continued)

*Primary Examiner* — Steven Kim
(74) *Attorney, Agent, or Firm* — Foley and Lardner LLP; John D. Lanza

(57) ABSTRACT

The disclosed technology can mitigate the risk of infringing a content owner's rights in legally-protectable content by operating as a trusted, third-party license authority between content owners and content users to ensure that a license governing at least some aspects of the protectable content is authentic and thus validly represents the restrictions imposed by content owners pertaining to the use, distribution, modification, combination, interaction, and/or other manipulation of such content. An identifier representative of the protectable content together with a profile of the license (which may include attributes that specify particular restrictions, uses, and interactions pertaining to the protectable content) can serve as a basis for determining the authenticity of the license associated with the protectable content. The protectable content can correspond to one or more multimedia presentations, video segments, audio segments, textual representations, works of art, visual representations, technological know-how, business know-how, contract rights, and/or software elements.

20 Claims, 3 Drawing Sheets

(56) References Cited

U.S. PATENT DOCUMENTS

| | | | |
|---|---|---|---|
| 6,188,995 B1* | 2/2001 | Garst et al. | 705/59 |
| 6,189,146 B1 | 2/2001 | Misra et al. | 717/11 |
| 6,219,652 B1* | 4/2001 | Carter et al. | 705/59 |
| 6,226,618 B1 | 5/2001 | Downs et al. | |
| 6,240,409 B1 | 5/2001 | Aiken | |
| 6,249,769 B1 | 6/2001 | Ruffin et al. | 705/7 |
| 6,260,141 B1 | 7/2001 | Park | 713/155 |
| 6,263,348 B1 | 7/2001 | Kathrow et al. | |
| 6,275,223 B1 | 8/2001 | Hughes et al. | |
| 6,282,698 B1 | 8/2001 | Baker et al. | |
| 6,330,670 B1 | 12/2001 | England et al. | 713/2 |
| 6,381,698 B1 | 4/2002 | Devanbu et al. | |
| 6,393,438 B1 | 5/2002 | Kathrow et al. | |
| 6,397,205 B1 | 5/2002 | Juola | |
| 6,480,834 B1 | 11/2002 | Engle et al. | |
| 6,480,959 B1 | 11/2002 | Granger et al. | 713/189 |
| 6,493,709 B1 | 12/2002 | Aiken | |
| 6,499,035 B1 | 12/2002 | Sobeski | |
| 6,546,114 B1 | 4/2003 | Venkatesan et al. | 382/100 |
| 6,557,105 B1* | 4/2003 | Tardo et al. | 713/193 |
| 6,574,348 B1 | 6/2003 | Venkatesan et al. | 382/100 |
| 6,581,044 B1* | 6/2003 | Alur | 705/59 |
| 6,658,626 B1 | 12/2003 | Aiken | |
| 6,697,948 B1* | 2/2004 | Rabin et al. | 726/30 |
| 6,862,696 B1 | 3/2005 | Voas et al. | |
| 6,931,532 B1 | 8/2005 | Davis et al. | |
| 6,941,459 B1 | 9/2005 | Hind et al. | |
| 6,954,738 B2* | 10/2005 | Wang et al. | 705/59 |
| 6,954,747 B1 | 10/2005 | Wang et al. | |
| 6,961,849 B1 | 11/2005 | Davis et al. | |
| 6,976,170 B1 | 12/2005 | Kelly | |
| 6,978,367 B1 | 12/2005 | Hind et al. | |
| 6,981,023 B1 | 12/2005 | Hamilton et al. | |
| 6,983,371 B1 | 1/2006 | Hurtado et al. | |
| 7,197,156 B1 | 3/2007 | Levy | |
| 7,254,587 B2 | 8/2007 | Lee et al. | |
| 7,278,130 B2 | 10/2007 | Iborra et al. | |
| 7,305,701 B2 | 12/2007 | Brezak et al. | |
| 2002/0065781 A1 | 5/2002 | Hillegass et al. | 705/59 |
| 2002/0138441 A1 | 9/2002 | Lopatic | 705/59 |
| 2002/0138477 A1 | 9/2002 | Keiser | |
| 2002/0138764 A1 | 9/2002 | Jacobs et al. | 713/201 |
| 2002/0162030 A1 | 10/2002 | Brezak et al. | |
| 2002/0188608 A1 | 12/2002 | Nelson et al. | 707/10 |
| 2002/0194010 A1 | 12/2002 | Bergler et al. | 705/1 |
| 2003/0018891 A1 | 1/2003 | Hall et al. | |
| 2003/0056121 A1* | 3/2003 | Kimoto et al. | 713/202 |
| 2003/0074163 A1 | 4/2003 | Anand et al. | |
| 2003/0079174 A1 | 4/2003 | Hooks | |
| 2003/0125975 A1 | 7/2003 | Danz et al. | |
| 2003/0126456 A1 | 7/2003 | Birzer et al. | 713/193 |
| 2003/0149588 A1* | 8/2003 | Joao | 705/1 |
| 2003/0159055 A1 | 8/2003 | Robbins et al. | |
| 2003/0163684 A1 | 8/2003 | Fransdonk | |
| 2003/0167236 A1 | 9/2003 | Stefik et al. | 705/51 |
| 2003/0172035 A1 | 9/2003 | Cronce et al. | 705/59 |
| 2003/0212639 A1* | 11/2003 | Cronce et al. | 705/57 |
| 2003/0229581 A1* | 12/2003 | Green et al. | 705/38 |
| 2004/0039916 A1* | 2/2004 | Aldis et al. | 713/177 |
| 2004/0068734 A1 | 4/2004 | Bond et al. | |
| 2004/0073789 A1 | 4/2004 | Powers | |
| 2004/0093593 A1 | 5/2004 | Jhanwar et al. | |
| 2004/0139340 A1 | 7/2004 | Johnson et al. | |
| 2004/0162827 A1 | 8/2004 | Nakano | |
| 2005/0015343 A1 | 1/2005 | Nagai et al. | |
| 2005/0027804 A1* | 2/2005 | Cahill et al. | 709/206 |
| 2005/0039034 A1 | 2/2005 | Doyle et al. | |
| 2005/0060643 A1 | 3/2005 | Glass et al. | |
| 2005/0065930 A1 | 3/2005 | Swaminathan et al. | |
| 2005/0114840 A1 | 5/2005 | Zeidman | |
| 2005/0125358 A1 | 6/2005 | Levin et al. | |
| 2005/0125359 A1 | 6/2005 | Levin et al. | |
| 2005/0166094 A1 | 7/2005 | Blackwell et al. | |
| 2005/0216898 A1 | 9/2005 | Powell, Jr. et al. | |
| 2005/0235342 A1 | 10/2005 | Ene-Pietrosanu et al. | |
| 2006/0005166 A1 | 1/2006 | Atkin et al. | |
| 2006/0015465 A1 | 1/2006 | Kume et al. | |
| 2006/0031364 A1 | 2/2006 | Hamilton et al. | |
| 2006/0031686 A1 | 2/2006 | Atallah et al. | |
| 2006/0107070 A1 | 5/2006 | Rice et al. | |
| 2006/0122983 A1 | 6/2006 | King et al. | |
| 2006/0155975 A1 | 7/2006 | Mueller | |
| 2006/0195540 A1 | 8/2006 | Hamilton et al. | |
| 2007/0157311 A1 | 7/2007 | Meier et al. | |
| 2007/0162890 A1 | 7/2007 | Meier et al. | |
| 2007/0294610 A1 | 12/2007 | Ching | |
| 2007/0299825 A1 | 12/2007 | Rush et al. | |
| 2008/0215897 A1 | 9/2008 | Doyle et al. | |
| 2008/0304669 A1 | 12/2008 | Bugbee | |

OTHER PUBLICATIONS

GPL Compliance Toolset, http://www.metrowerks.com/MW/Develop/Embedded/Linux/GPLCT.htm, printed on Nov. 25, 2003, pp. 1-2.

ZDNet UK—News—Motorola picks Lineo for set-top box http://news.zdnet.co.uk/hardwarde/emergingtech/0.39020357.2093969.00.htm, printed on, Nov. 26, 2003, pp. 1-3.

Lineo launches 'anti-FUD' campaign with license ID tool, http://www.linuxdevices.com/news/NS6538038187.html, printed on Nov. 26, 2003, pp. 1-4.

Linux DevCenter: Lineo's GPL Compliance Tool [Oct. 4, 2001], http://www.oreillynet.com/pub/a/linux/2001/10/04/lineo.html, printed on Nov. 26, 2003, pp. 1-4.

LIDESC: Librock License Awareness System, http://www.mibsoftware.com/librock/lidesc, printed on Nov. 26, 2003, pp. 1-2.

Creating a LIDESC_TAGS string, http://www.mibsoftware.com/librock/lidesc/tags.htm, printed on Nov. 26, 2003, pp. 1-9.

NewsForge/ New utility helps prevent software license violations, http://www.newsforge.com/software/02/04/23/163211.shtml?tid=51, printed on Nov. 26, 2003, pp. 1-3.

New utility helps prevent software license violations [NewsForge], http://www.linuxdevices.com/news/NS3340825769.html, printed on Nov. 26, 2003, pp. 1-3.

[fsl-discuss] Automatic reporting of license terms, http://lists.alt.org/pipermail/fsl-discuss/2002-April1/000309.html, printed on Nov. 26, 2003, pp. 1-2.

[fsl discuss] Automatic reporting of license terms, http://lists.alt.org/pipermail/fsl-discuss/2002-April/000312.html, printed on Nov. 26, 2003, pp. 1-3.

Query FTP Software License Database, http://www.uth.tmc.edu/iaims/network/ftp.html, printed on Nov. 26, 2003, p. 1.

TapTopFolder, http://www.systemconsulting.co.uk/index.php?page=software/products.html, printed on Nov. 26, 2003, p. 1

TapTopFolder, http://www.systemconsulting.co.uk/index.php?page=software/products/writeme.html, printed on Nov. 26, 2003, p. 1.

TapTopFolder, http://www.systemconsulting.co.uk/index.php?page=software/products/licensedb.html, printed on Nov. 26, 2003, p. 1.

ASAP Software, A Buhrmann Company, 1999-2002 ASAP Software, pp. 1-2.

http://www.mibsoftware.com/librock/lidesc, printed Jul. 18, 2003, pp. 1-23.

Article: How Copyleft Uses License Rights to Succeed in the Open Source Software Revolution and the Implication for Article 2B, HCUL.doc, Oct. 2, 2003, pp. 179-194.

Various Licenses and Comments about Them- GNU Project—Free Software Foundation (FSF), http://www.fsf.org/licenses/license-list.html, printed Nov. 26, 2003, pp. 1-15.

Cleanscape lint jump page, http://www.cleanscaoe.net/products/lintonline/login.html, printed on Nov. 26, 2003, p. 1.

Code Analysis Settings, http://www.ascensionlabs.com/pbca_CodeAnalysisSettings.htm, printed on Nov. 26, 2003, p. 1.

PB Code Analyzer, http://www.ascensionlabs.com/pbcodeanalyzer.htm, printed on Nov. 26, 2003, pp. 1.5.

Microsoft Software Asset Management: Microsoft Software Inventory Analyzer, http://www.microsoft.com/resources/sam/msia.mspx, printed on Nov. 26, 2003, p. 1.

(56) References Cited

OTHER PUBLICATIONS

Fougner, Network Working Group Request for Comments: 1170, "Public Key Standards and Licenses", http://ftp.rfc-editor.org/in-notes/rfc1170.txt printed on Nov. 26, 2003, pp. 1-2.
Huitema, Network Working Group Request for Comments: 1383, "An Experiment in DNS Based IP Routing" http://ftp.rfc-editor.org/in-notes/rfc1383.txt, printed on Nov. 26, 2003, pp. 1-14.
Eastlake et al, Network Working Group Request for Comments: 3174, "US Secure Hash Algorithm 1 (SHA1)", http://ftp.rfc-editor.org/in-notes/frc3174.txt, printed on Nov. 26, 2003, pp. 1-21.
Arsenault et al., Network Working Group Request for Comments: 3157, "Securely Available Credentials—Requirements" http://flp.rfc-editor.org/in-notes/rfc3157.txt, printed on Nov. 26, 2003, pp. 1-19.
Rescorla et al., Network Working Group Request for Comments: 2660, "The Secure HyperText Transfer Protocol", http://ftp.rfc-editor.org/in-notes/rfc2660.txt, printed on Nov. 26, 2003, pp. 1-43.
Pethia et al., Network Working Group Request for Comments: 1281, "Guidelines for the Secure Operation of the Internet", http://ftp.rfc-editor.org/in-notes/rfc1281.txt, printed on Nov. 26, 2003, pp. 1-10.
Rivest, Network Working Group Request for Comments: 1321, "The MD5 Message-Digest Algorithm", http://flp.rfc-editor.org/in-notes/rfc1321.txt, printed on Nov. 26, 2003, pp. 1-2.
Open Source Initiative OSI—The Open Source Definition, http://www.opensource.org/docs/definition.php, printed on Nov. 26, 2003, pp. 1-4.
Open Source Initiative OSI—Certification Mark and Process, http://www.opensource.org/docs/certification_mark.php, printed on Nov. 26, 2003, pp. 1-5.
Open Source Initiative OSI—Licensing, http://www.opensource.org/licenses/index.php, printed on Nov. 26, 2003, pp. 1-2
Open Source Initiative OSI—The Attribution Assurance License: Licensing, http://www.opensource.org/licenses/attribution.php, printed on Nov. 26, 2003, pp. 1-3.
A System for Detecting Software Plagiarism, http://cs.berkeley.edu/~aiken/moss.html, Nov. 4, 2005.
Clough, "Plagiarism in natural and programming languages: an overview of current tools and technologies", http://www1.compaq.com/pressrelease/0,1494,wp%7E14583_2!ob%7E29892_1_1.00.html, pp. 1-31, Jun. 2000.
Cohen, "Recursive Hashing Functions for $n$-Grams", *ACM Transactions on Information Systems*, 15(3):291-320 (1997).
Damashek, "Gauging Similarity with n-Grams: Language-Independent Categorization of Text", *Science*, New Series, 267(5199)843-848 (1995).
Heckel et al., "A Technique for Isolating Differences Between Files", *Communications of the ACM*, 21(4):264-268 (Apr. 1978).
Johnson, "Identifying Redundancy in Source Code using Fingerprints", pp. 171-183.
Prechelt et al., "Finding plagiarisms among a set of programs with JPlag", Resubmission to J. of Universal Computer Science, Nov. 28, 2001, http://www.jucs.org/.
Schleimer et al., "Winnowing: Local Algorithms for Document Fingerprinting", pp. 76-85.
Si et al., "Check: A Document Plagiarism Detection System", pp. 70-77.
Verco et al., "Plagiarism á la Mode: A Comparison of Automated Systems for Detecting Suspected Plagiarism", *The Computer Journal*, 39(9):741-750 (1996).
Whale, "Identification of Program Similarity in Large Populations", *The Computer Journal*, 33(2):140-146 (1990).
Wise et al., "YAP3: Improved Detection of Similarities in Computer Program and Other Texts", pp. 130-134.
Cole et al. "Verifying Candidate Matches in Sparse and Wildcard Matching" [online]. Montreal, Quebec, Canada, STOC 02, May 19, 2002—May 21, 2002 [retrieved Oct. 30, 2007]. Retrieved from the Internet: <www.citeseer.org>, 10 pages.
International Search Report for related PCT Application No. PCT/US2007/011022, mailed Nov. 12, 2007, 4 pages.
Kamps et al. "Best Match Querying form DocumentCentric XML" [online]. Seventh International Workshop on the Web and Databases, Amsterdam, Netherlands, (WEBDB 2004), Jun. 17, 2004—Jun. 18, 2004 [retrieved on Oct. 30, 2007]. Retrieved from the Internet: <http://staff.science.uva.nl/{mdr/Publications/Files/webdb2004.pdf>, pp. 55-60.
Meziane et al. "A Document Management Methodology Based on Similarity Contents." Elsevier, 2003, Salford, United Kingdom, Information Sciences vol. 158 (2004), pp. 15-36.
Office Action issued in related U.S. Appl. No. 10/728,174, mailed Jan. 25, 2008, 10 pages.
Office Action issued in related U.S. Appl. No. 11/084,063, mailed Sep. 21, 2008, 15 pages.
Written Opinion for related PCT Application No. PCT/US2004/040453, mailed Jun. 4 ,2006, 6 pages.
Written Opinion for related PCT Application No. PCT/US2006/008369, mailed Sep. 18, 2007, 4 pages.
Written Opinion for related PCT Application No. PCT/US2007/011022, mailed Nov. 12, 2007, 8 pages.
Examination Report for related European Application No. 06737533.7, mailed Jan. 15, 2008, 2 pages.
Office Action issued in related U.S. Appl. No. 10/084,063, mailed May 1, 2008, 15 pages.
Farringdon, Jill M., *Introduction to Analysing for Authorship: A Guide to the Cusum Technique*, Retrieved from Website: <http://members.aol.com/qsum/>, Introduction link, web pages dated Oct. 13, 2004, Retrieved via The Wayback Machine: <www.archive.org>, 11 pages.
Invitation Pursuant to Article 94(3) and Rule 71(1) EPC for European Patent Application No. 06737533.7 dated Jun. 2, 2008, 2 pages.
Office Action issued in related U.S. Appl. No. 11/429,928 mailed Jun. 27, 2008, 14 pages.
Office Action issued in related U.S. Appl. No. 11/580,220, mailed Jul. 9, 2008, 9 pages.
Examination Report for European Application No. 06737533.7, mailed Aug. 28, 2008, 5 pages.
"TeleKnowledge" M2 Presswire. Coventry: Jul. 1, 2002, 1 page.
Menezes, Alfred J., "Handbook of Applied Cryptography", copyright 1997 by CRC Press LLC, pp. 22-23.
Notice of Allowance issued in U.S. Appl. No. 10/728,174, mailed Feb. 4, 2009, 10 pages.
Office Action issued in U.S. Appl. No. 11/326,806, mailed Feb. 26, 2009, 13 pages.
Office Action issued in U.S. Appl. No. 11/961,975, mailed Nov. 12, 2010, 14 pages.
Office Action issued in U.S. Appl. No. 11/961,975, mailed Jul. 21, 2011, 14 pages.
Written Opinion for PCT Application No. PCT/US2007/000272, mailed Nov. 19, 2008, 5 pages.
Written Opinion for PCT Application No. PCT/US2007/021648, mailed Jan. 30, 2009, 5 pages.

\* cited by examiner

AUTHENTICATING LICENSES FOR LEGALLY-PROTECTABLE CONTENT BASED ON LICENSE PROFILES AND CONTENT IDENTIFIERS

RELATED APPLICATIONS

This patent is related to concurrently-filed U.S. Utility patent application Ser. No. 10/728,174, entitled "Resolving License Dependencies for Aggregations of Legally-Protectable Content," and issued as U.S. Pat. No. 7,522,093 on Jun. 23, 2009, the entirety of which is incorporated herein by reference.

TECHNICAL FIELD

The disclosed technology relates generally to license authentication and more particularly to a license authority capable of authenticating licenses and/or owners of such licenses for legally-protectable content based, at least in part, on license profiles and content identifiers associated with such legally-protectable content.

BACKGROUND

Individuals, groups, associations, organizations, and/or other types of entities interested in using, installing, distributing, selling, acquiring, compiling, aggregating, and/or otherwise intermingling and/or interacting with legally-protectable content such as music, art, video, text, multimedia, technology (e.g., software), technological/business know-how, contract rights, and/or any other type of content that is protectable under patent law, copyright law, trademark law, trade secret law, contract law, and/or under other legal bases need to consider the individual rights, restrictions, and/or prohibitions established by content owners for the use, distribution, modification, combination, interaction, and/or other manipulation of such content to avoid infringing upon the content owners' rights in that content.

For example, an information technology professional, such as a Chief Information Officer of a corporation, may want to ensure that a license whose terms govern manipulations of a software element being considered for installation and integration within a corporation's technological infrastructure is authentic and that such terms coincide with the information technology professional's expectations so as to avoid infringing a content owner's rights in that software element and exposing the corporation to unexpected legal/financial liabilities. The risk of infringing a content owner's rights in a software element is increased when such elements are used in collaborative development environments in which entities developing particular software elements share such elements with other entities, who may be potentially unrelated to the developing entities. Unlike traditional development environments in which a single entity controls the entire development of a software product and the ownership and rights in the software product are well known and/or readily identifiable, the software products generated, at least in part, by aggregating software elements from multiple entities in a collaborative development environment, obfuscate the legal rights, obligations, restrictions, and/or prohibitions that pertain to an aggregated software product and thus increase the risk that the makers, distributors, installers, maintainers, users, and/or other entities associated with an aggregated software product may infringe upon the legal rights of one or more of the entities that developed the constituent software elements that were incorporated into the aggregated software product.

Although content owners can mitigate the uncertainty in the legal rights associated with particular aggregated content by forming licenses that explicitly set forth the rights, obligations, restrictions and/or prohibitions governing the use of aggregated content (e.g., the GNU General Public License, the Berkeley Software Distribution License, the Mozilla Public License, etc.), it becomes increasingly more difficult to do so as the number of collaborating content owners and the complexity of the aggregated content increase. Accordingly, entities participating in a collaborative environment have a continuing interest in developing technologies that can mitigate the risk of infringing another's rights in legally-protectable content incorporated into an aggregated content product and/or service.

SUMMARY

The disclosed technology can mitigate the risk of infringing a content owner's rights in legally-protectable content by, for example, operating as a trusted, third-party license authority between content owners and content users/manipulators to ensure that a license governing at least some aspects of the protectable content is authentic and thus validly represents the restrictions imposed by one or more content owners pertaining to the use, distribution, modification, combination, interaction, and/or other manipulation of such content.

In one embodiment, the disclosed technology can be used to develop systems and perform methods in which a license profile associated with a protectable content and which identifies attributes affecting at least one operation of the protectable content is accessed along with an identifier that represents the protectable content. The license profile and the protectable content identifier can serve as a basis for determining an authenticity of a license associated with the protectable content. In one illustrative embodiment, the license profile based on the license associated with the protectable content and/or the protectable content identifier (formed by, for example, a hash algorithm) can be formed by (or on behalf of) an owner of the protectable content and the license profile and protectable content identifier can be subsequently validated by an independent third-party entity that is otherwise not associated with the content owner. The protectable content can correspond to one or more multimedia presentations, video segments, audio segments, textual representations, works of art, visual representations, technological know-how (e.g., manufacturing processes), business know-how (e.g., marketing information), contract rights, and/or software elements (e.g., open source software compliant with an open source definition, proprietary software not compliant with an open source definition, etc.).

In one illustrative embodiment in which the protectable content corresponds to one or more software elements, the license attributes identified by the license profile can, for example, correspond to license terms in the license associated with the protectable content, where such attributes correspond to one or more software code formats, software naming conventions, software code annotations, warranties, reverse-engineering activities, patent litigation activities, standards bodies, violations of intellectual property rights, and/or textual descriptions of at least one aspect of the protectable content. One or more restriction values that may be assigned to and/or otherwise be associated with one or more of the license attributes can, for example, correspond to a prohibition, a requirement, or a nullity (a neutral value that may be, for example, equivalent to the terms, "none" or "not applicable") and can be set to, for example, true, false, required, don't care, forbidden, 1 (indicating a requirement), 0 (indicating a nullity), −1 (indicating a prohibition), and/or a textual value. One or more use values that may be assigned to and/or otherwise be associated with one or more of the license attributes can, for example, correspond to a permissible degree of distribution of the protectable content and can be set, for example, to values that reflect a particular acquisition, a personal use, a research use, an organizational use, a limited distribution use, and/or an unlimited distribution use of one or more aspects of the protectable content. One or more of the assigned use values can also be equivalent to or override a default use associated with the license. Similarly, one or more interaction values that may be assigned to and/or otherwise be associated with one or more of the license attributes can, for example, correspond to a permissible degree of distribution of the protectable content and can be set, for example, to values that reflect an original element, a modified element, a group of distinct elements, a group of interconnected elements, a group of elements capable of providing more than one function, an unrestricted manipulation of elements, and an unrestricted ownership of elements of one or more aspects of the protectable content. As with use values, one or more of the assigned interaction values can also be equivalent to or override a default interaction associated with the license.

In one illustrative embodiment, an encrypted and/or digitally-signed request message that is transmitted by (or on behalf of) an owner of protectable content and which includes indicia pertaining to a protectable content identifier (e.g., the identifier itself, a type of algorithm used to form the identifier, etc.), a license profile, and/or the content owner can be received and such indicia can serve as a basis for computing an identifier associated with a license of the protectable content. The computed license identifier can be encrypted, digitally-signed, and transmitted to the content owner for subsequent coupling with the protectable content that is distributed to one or more users of the protectable content. One or more users of the protectable content can transmit a request message to authenticate a license associated with the protectable content and upon receipt of such request message the computed license identifier can be compared with a corresponding license identifier provided by one or more of such users. This comparison can serve as a basis for determining, providing, and/or otherwise making indicia pertaining to the authenticity of the license accessible to the requesting user, such indicia can, for example, include the authenticated license itself, an authenticated profile of the license, information identifying an owner of the authenticated license, information identifying the owner of the protectable content, a measure of risk associated with the authenticity of the license, and/or an alphanumeric code enabling the operation of one or more aspects of the protectable content.

BRIEF DESCRIPTION OF THE DRAWINGS

The foregoing discussion will be understood more readily from the following detailed description of the disclosed technology, when taken in conjunction with the accompanying drawings in which.

DETAILED DESCRIPTION

Figure 1A:
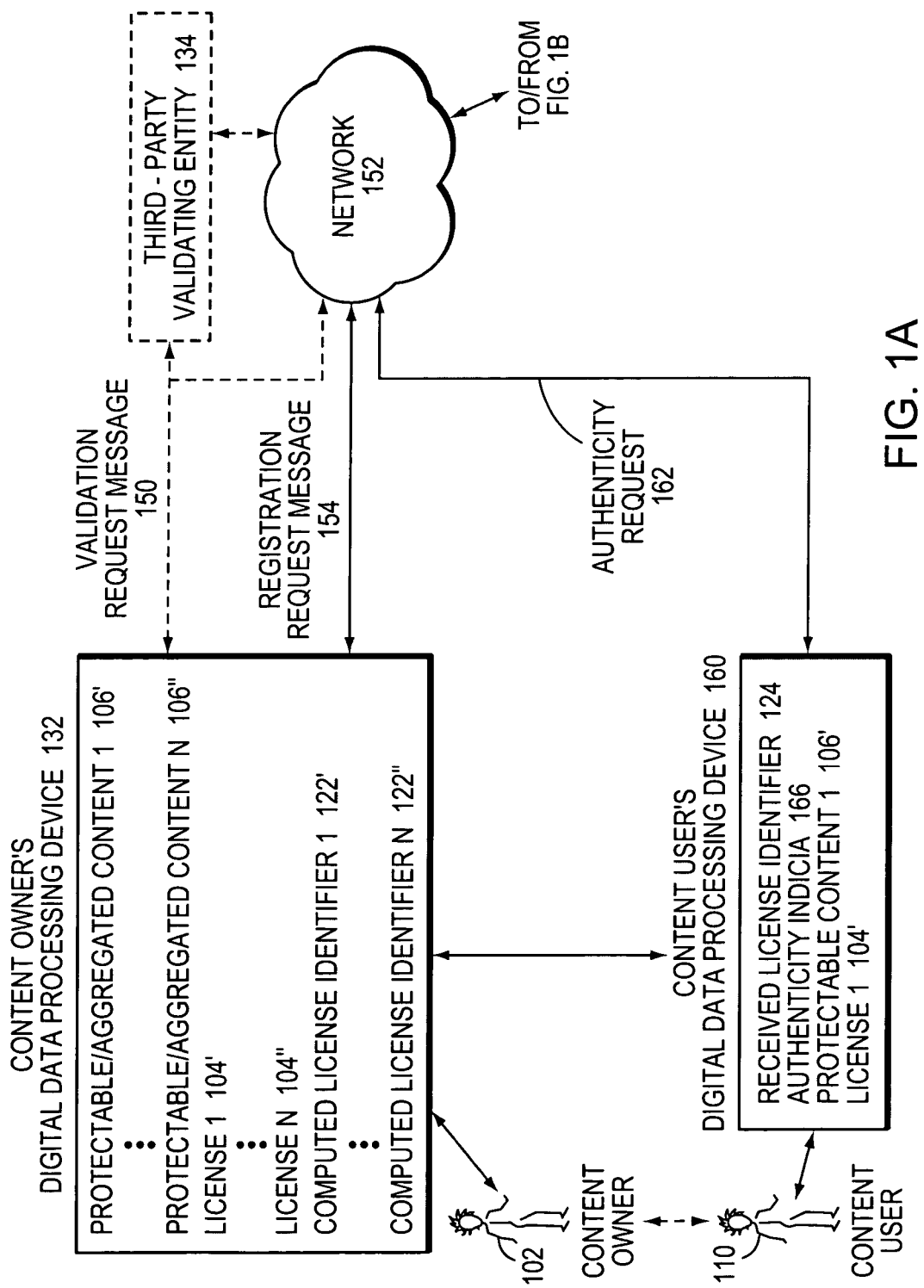
FIGS. 1A and 1B schematically illustrate an exemplary licensing authority architecture employing aspects of the disclosed technology that can be used to authenticate one or more licenses associated with protectable-content elements.

Unless otherwise specified, the illustrated embodiments can be understood as providing exemplary features of varying detail of certain embodiments, and therefore, unless otherwise specified, features, components, processes, elements, data, attributes, attribute values, and/or aspects of the illustrations can be otherwise combined, interconnected, sequenced, separated, interchanged, relocated/repositioned, and/or rearranged without departing from the disclosed systems or methods.

For the purposes of this disclosure, the term "substantially" can be broadly construed to indicate a precise relationship, condition, arrangement, orientation, and/or other characteristic, as well as, deviations thereof as understood by one of ordinary skill in the art, to the extent that such deviations do not materially affect the disclosed methods and systems.

For the purposes of this disclosure, the term "software process" can refer to a set of executable instructions, operations, variables, parameters, data, data structures, software drivers, plug-ins, and/or any other type of elements that are needed to form an execution environment sufficient to perform the desired functionality of the process. Those skilled in the art will recognize that the functionality described for a particular software process can be incorporated into one or more other processes and that the software processes themselves can be otherwise combined, separated, and/or organized without adversely affecting the operation of the disclosed technology and thus are intended merely for illustrative purposes. The term, "data structure," can refer to a database table, a linked list, and/or any other type of data format or configuration that enables a data set to be referenced.

For the purposes of this disclosure, the term "content" (also referred to herein as "protectable content," "protectable-content element," or "constituent protectable-content element") can be construed broadly to refer, separately or in any combination, to one or more multimedia presentations, video segments, audio segments, textual representations, works of art, visual representations, technological know-how (e.g., manufacturing processes), business know-how (e.g., marketing information), contract rights, software elements (e.g., open source software compliant with an open source definition, proprietary software not compliant with an open source definition, etc.), and/or any other type of matter/representation that may be, legally-protectable under patent law, copyright law, trademark law, trade secret law, contract law, and/or under other legal bases. "Aggregated content" (also referred to herein as an "aggregated-content element") can refer to a collection and/or combination of at least some aspects of two or more protectable-content elements that cooperate to perform one or more desired functions, where such protectable-content elements may be separately and/or individually licensed/owned. Those skilled in the art will recognize that aggregated-content elements can also be combined with other aggregated and/or non-aggregated content elements to form content elements that exhibit relatively higher levels of aggregation.

For the purposes of this disclosure, the term "license authority" can refer broadly to one or more software processes (e.g., software processes that handle requests, analyze protectable content, evaluate licenses, aggregate licenses, provide substantially unique identifiers of the licenses and protectable content, and/or assess risk) that operate on protectable content, licenses, license profiles, and/or other types of data and parameters so as to serve as a trusted, third-party entity between owners and users/manipulators of protectable content, which can authenticate the validity of licenses, identify content owners, and/or determine risk measures that may be used to insure against potential legal/financial liability that may be incurred if a content owner's rights in a particular protectable content are infringed by an unwitting content user/manipulator.

For the purposes of this disclosure, the term "software code" can refer broadly to source code and/or object code, where source code refers to programming statements generated by and/or readily identifiable by a software programmer and where object code refers to a compiled version of the source code that is understood by a processor of a digital data processing device, but which is difficult to understand and/or manipulate by a human.

For the purposes of this disclosure, the term "digital data processing device" can refer to a personal computer, computer workstation, laptop computer, server computer, mainframe computer, handheld device (e.g., personal digital assistant, Pocket PC, cellular telephone, etc.), information appliance, or any other type of generic or special-purpose, processor-controlled device capable of receiving, processing, and/or transmitting digital data. A processor refers to the logic circuitry that responds to and processes instructions that drive digital data processing devices and can include, without limitation, a central processing unit, an arithmetic logic unit, an application specific integrated circuit, a task engine, and/or any combinations, arrangements, or multiples thereof.

The instructions executed by a processor represent, at a low level, a sequence of "0's" and "1's" that describe one or more physical operations of a digital data processing device. These instructions can be pre-loaded into a programmable memory (e.g., EEPROM) that is accessible to the processor and/or can be dynamically loaded into/from one or more volatile (e.g., RAM, cache, etc.) and/or non-volatile (e.g., hard drive, etc.) memory elements communicatively coupled to the processor. The instructions can, for example, correspond to the initialization of hardware within a digital data processing device, an operating system that enables the hardware elements to communicate under software control and enables other computer programs to communicate, and/or software application programs/software processes that are designed to perform particular functions for an entity or other computer programs, such as functions relating to processing license registration requests and/or license authentication requests.

A local user can interact with a digital data processing device by, for example, viewing a command line, graphical, and/or other user interface and entering commands via an input device, such as a mouse, keyboard, touch sensitive screen, track ball, keypad, etc. The user interface can be generated by a graphics subsystem of a digital data processing device, which renders the interface into an on or off-screen surface (e.g., in a video memory and/or on a display screen). Inputs from the user can be received via an input/output subsystem and routed to a processor via an internal bus (e.g., system bus) for execution under the control of the operating system.

Similarly, a remote user can interact with a digital data processing device over a data communications network. The inputs from the remote user can be received and processed in whole or in part by a remote digital data processing device collocated with the remote user. Alternatively or in combination, the inputs can be transmitted back to and processed by the local digital data processing device or to another digital data processing device via one or more networks using, for example, thin client technology. The user interface of the local digital data processing device can also be reproduced, in whole or in part, at the remote digital data processing device collocated with the remote user by transmitting graphics information to the remote device and instructing the graphics subsystem of the remote device to render and display at least part of the interface to the remote user. Network communications between two or more digital data processing devices typically require a network subsystem (e.g., as embodied in a network interface card) to establish the communications link between the devices. The communications link interconnecting digital data processing devices can include elements of a data communications network, a point to point connection, a bus, and/or any other type of digital data path capable of conveying processor-readable data.

A data communications network (e.g., Internet, intranets, etc.) can comprise a series of network nodes that can be interconnected by network devices and communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from a source node to a destination node regardless of any dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes.

For the purposes of this disclosure, the term "license" can refer to a collection of clauses (e.g., license terms) that set forth restrictions (e.g., requirements, obligations, grants, prohibitions, limitations, etc.) that may affect a use (e.g., distribution), interaction (e.g., modification, combination), and/or other manipulation of protectable content. "License alternatives" can refer to one or more licenses that may be suitable for a particular operational/deployment environment of an aggregated-content element. An "aggregated license" can refer to a license that sets forth restrictions for an aggregated-content element.

For the purposes of this disclosure, "license attributes" can refer to representations of license restrictions that may be processed by software processes executing on one or more digital data processing devices. A collection of license attributes associated with a particular protectable content and/or a particular license can be referred to as a "license profile." License attributes can exhibit one or more restriction values, use values, and/or interaction values that may facilitate an attribute-by-attribute analysis of two or more protectable-content elements that form at least part of an aggregated content. A restriction value can specify an applicability of one or more license attributes to a content element by, for example, specifying if such attributes are required, prohibited, not applicable, true, false, or the like. A use value can represent a permissible degree of distribution associated with one or more license attributes. Similarly, an interaction value can represent a permissible degree of manipulation associated with one or more license attributes.

By way of non-limiting example and with reference to an embodiment in which protectable content refers to software elements, a non-exclusive list of license attributes that may be associated with such software elements can correspond to one or more software code formats (e.g., requirement for providing access to source code if executable code is distributed, requirement to make newly-added software code available in a source code format, requirement to distribute newly-added source code under terms of a particular license, etc.), software naming conventions (e.g., requirement that non-original software files be renamed to avoid conflict with names of original software files), software code annotations (e.g., requirement that a notification be added to modified executable and/or source code), warranties (e.g., disclaimer of warranties and liability for original source code), fees (e.g., allowing warranty fees, distribution/media cost-recovery fees, and/or software program fees associated with one or more software elements, etc.), reverse-engineering activities (e.g., requirement that distributed and/or newly-added software code be capable of reverse-engineering), patent litigation activities (e.g., contingency in which initiation of a patent litigation terminates a license), standards bodies (e.g., requirement that newly-added software code conform to applicable standards specified by a particular standards body), violations of intellectual property rights (e.g., requirement that contributors of new software code warrant that such new code is free of intellectual property violations and that all applicable rights have been properly secured, prohibition against using the name and trademarks associated with an original software element and/or original author in promoting modified software code, etc.), and/or textual descriptions of corresponding licenses (e.g., requirement to include the actual text of an original license when distributing corresponding software code, requirement to include explanatory license text for software modifications, requirement to display notifications during execution of software code, requirement to provide license text regarding a distribution term and/or attribution procedures, etc.). As described above, restriction values can specify an applicability of one or more such license attributes to a software element by, for example, specifying if such attributes are required, prohibited, not applicable, true, false, etc. Continuing with the exemplary software element embodiment, use values assigned to one or more license attributes can, for example, correspond to an acquisition, a personal use, a research and development use, an organizational use (e.g., a deployment of software code within an organization in a form that may exceed personal use and/or research and development use), a limited distribution use (e.g., a deployment of software code without wide distribution), and/or an unlimited distribution use (e.g., a distribution of software code to unrelated entities) of at least one aspect of a software element. Similarly, interaction values assigned to one or more license attributes can, for example, correspond to an original software element (e.g., unmodified source code), a modified software element (e.g., original source files that have been altered by the addition of new code or the deletion of some original code), a group of distinct software elements (e.g., a collection of original and added source code files forming a software module), a group of interconnected software elements (e.g., a collection of original and/or added source code and object code files forming a library, where such files are meant to be linked with other software elements), a group of software elements capable of providing one or more functions (e.g., software code capable of being compiled into an executable software application program, software code capable of providing separate and interoperable software application programs, etc.), an unrestricted manipulation of software elements, and/or an unrestricted ownership of software elements.

Collaborative development environments in which individuals, organizations, and/or other entities engage in joint intellectual, artistic, and/or other expressive efforts to advance/expedite development in an area of interest may necessitate interactions with protectable content that may be proprietary to one or more of such entities. Restrictions affecting a use (e.g., distribution), interaction (e.g., modification, combination), and/or other manipulation of protectable content can be stipulated by an owner of such content in license terms set forth, for example, in one or more license agreements that may enable interested parties to use and/or interact with the content in a manner that facilitates collaboration, while concurrently avoiding infringement of the content owner's rights in such protectable content. The likelihood of infringing a content owner's rights in protectable content is particularly acute in situations in which two or more protectable-content elements are combined and/or otherwise manipulated to form an aggregated content, which may be subject to the restrictions of its constituent, protectable-content elements as may be set forth as terms in one or more licenses. The disclosed technology can mitigate the risk of infringing a content owner's rights in protectable content by operating as a trusted, third-party license authority between content owners and content users to ensure that a license governing at least some aspects of the protectable content is authentic and thus validly represents the restrictions imposed by content owners pertaining to the use, distribution, modification, combination, interaction, and/or other manipulation of such content.

The disclosed technology can also be used in determining a measure of risk that pertains to a level of confidence that a particular license is authentic. In one illustrative embodiment, the disclosed technology can be used to determine a license profile for a particular license of interest and the risk measure can be based, at least in part, on the entity that developed such license profile. For example, a relatively high risk measure that represents a relatively low-level of confidence that a particular license is authentic and/or that such license adequately identifies a content owner's rights in a protectable content of interest may be encountered if the content owner generates a corresponding license profile without the benefit of automated content analysis and/or license evaluation software tools/processes and/or without involvement of a third-party entity to validate the accuracy of the license profile. Similarly, a relatively moderate risk measure that represents a relatively medium-level of confidence that a particular license is authentic and/or that such license adequately identifies a content owner's rights in a protectable content of interest may be encountered if a content owner employs automated content analysis and/or license evaluation software tools/processes to generate a corresponding license profile, but does not validate the accuracy of the license profile using a third-party entity. Further, a relatively low risk measure that represents a relatively high-level of confidence may be encountered if automated content analysis and/or license evaluation software tools/processes are used to generate the corresponding license profile and one or more third-party (independent) entities validate the accuracy of such license profile.

The risk measure and/or confidence level can serve as a basis for one or more entries in an actuarial data structure (e.g., database table), which can subsequently be used to determine one or more provisions in an insurance contract (e.g., pertaining to a premium) that may insure particular content users, manipulators, and/or aggregators for potential liability that may arise upon infringement of a content owner's rights in protectable content. In one embodiment, relatively low risk measures and high confidence levels may enable content users/aggregators to purchase liability insurance for potential infringement of protectable content at a favorable premium, whereas moderate risk measures and confidence levels may result in higher premiums and relatively high risk measures and low confidence levels may result in more burdensome premiums or may perhaps result in a lack of insurance carriers willing to engage in such liability insurance contracts.

Figure 1B:
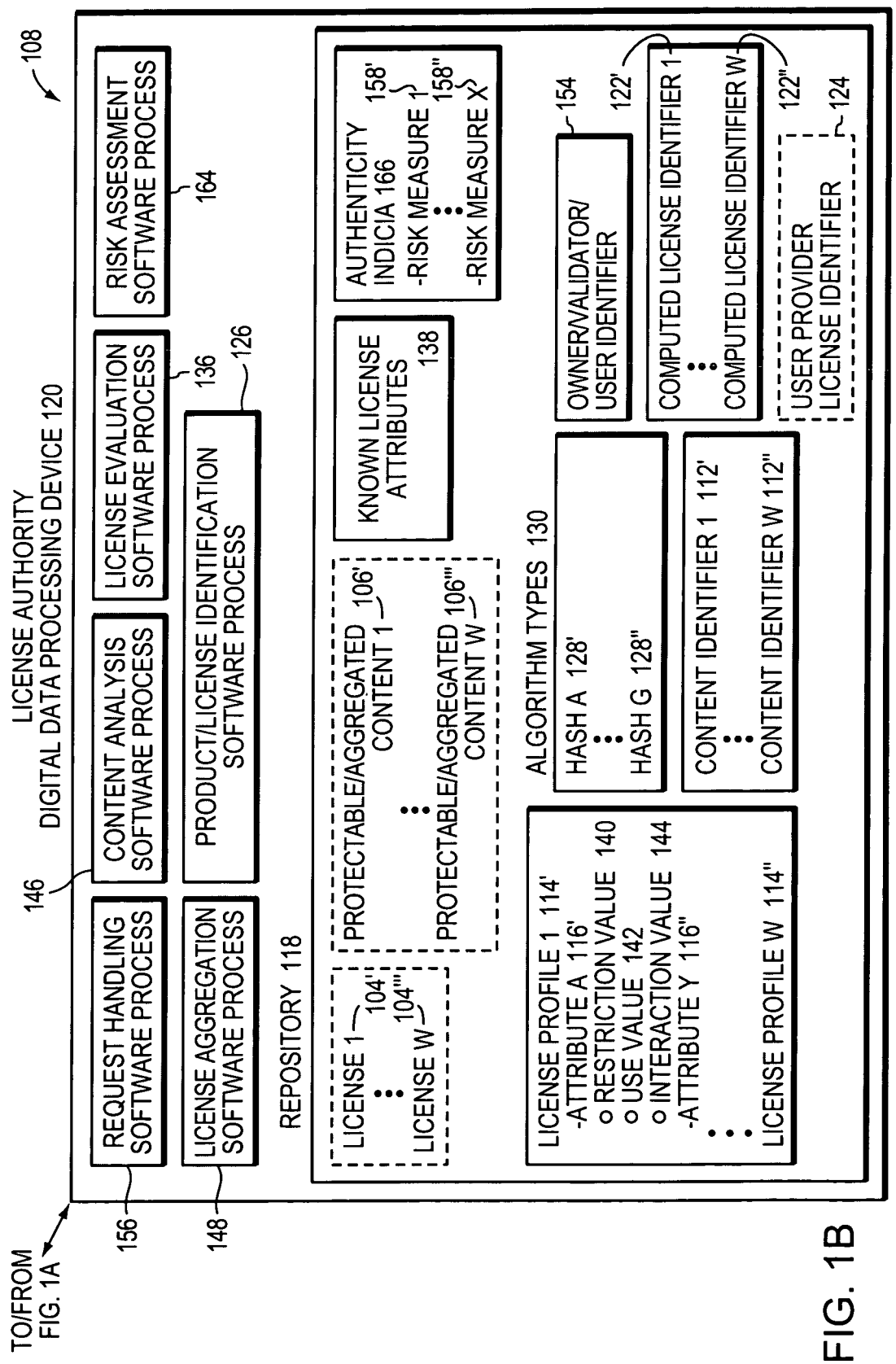

In brief overview and with reference to an illustrative embodiment of at least some aspects of the disclosed technology as shown in FIGS. 1A and 1B, a content owner 102 (and/or other entities/software processes authorized to act on behalf of such content owner 102) can register one or more licenses 104 of one or more protectable and/or aggregated content elements 106 with a trusted, third-party entity (e.g., the license authority 108), which can subsequently authenticate the validity of such licenses 104 and their applicability to particular protectable content elements 106, upon request by one or more users 110 of such content 106. Licenses 104 for particular protectable content elements 106 can be registered with a license authority 108 by, for example, generating content identifiers 112 that substantially uniquely identify particular protectable content elements of interest 106, generating one or more license profiles 114 that represent attributes 116 of corresponding licenses 104, and storing such content identifiers 112 and license profiles 114 within a repository 118 residing in and/or otherwise accessible to a digital data processing device 120 supporting the operations of the license authority 108. The license authority 108 can compute an identifier 122 that substantially uniquely represents a license 104 and its association with a corresponding protectable content 106 based, at least in part, on the license profile 114 and content identifier 112 associated therewith. A content owner 102 can provide the computed license identifier 122 to a content user 110 prior to, concurrently, or after providing the user 110 with the corresponding protectable content 106 and the user 110 can authenticate the validity and applicability of the content's license 104 by, for example, requesting that the license authority 108 confirm that the license identifier 124 received from the content owner 102 is substantially equivalent to the license identifier 122 previously computed by such license authority 108.

Figure 2:
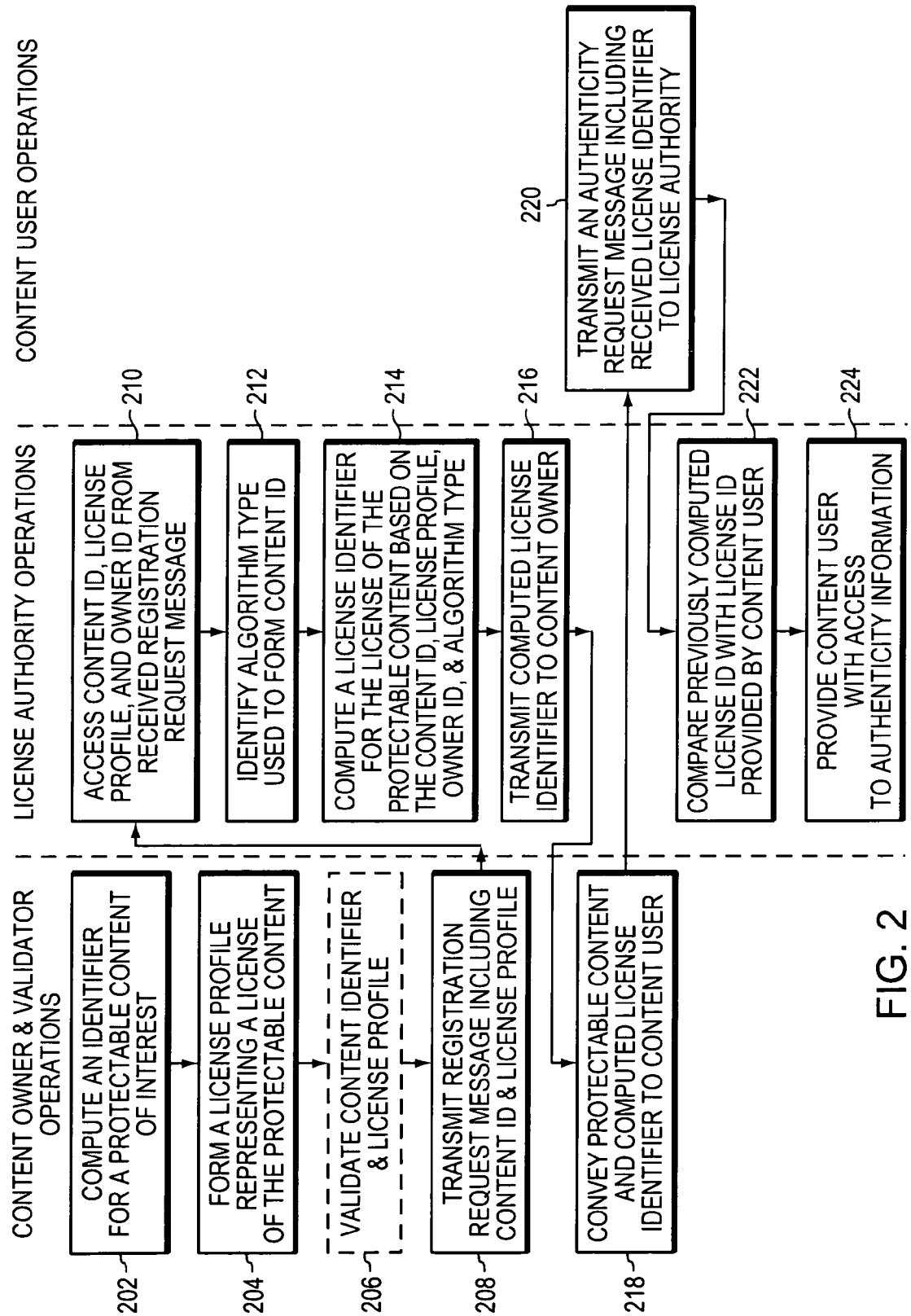
FIG. 2 illustrates an exemplary methodology that may be performed by one or more software processes executing within the licensing authority architecture of FIGS. 1A and 1B to authenticate licenses associated with protectable-content elements of interest.

In more detail and with reference now also to an illustrative operation as shown in FIG. 2, a content owner 102 can provide a product/license identification software process 126 with access (e.g., network access, web access, and/or any other type of direct or indirect access) to one or more protectable/aggregated content elements of interest 106 and such software process 126 can apply one or more hash algorithms 128 and/or other algorithm types 130 to the protectable/aggregated content elements of interest 106 to compute a content identifier 112 thereof (202). Those skilled in the art will recognize that the particular hash algorithm 128 used to transform characters within the protectable/aggregated content elements 106 into one or more representative values (i.e., content identifiers 112) may employ, for example, a division remainder method, a folding method, a radix transformation method, a digit rearrangement method, a secure hash method, an MD2 method, an MD4 method, an MD5 method, and/or any other type of methodology, technique, or algorithm that can substantially uniquely identify protectable/aggregated content elements of interest 106. Although the illustrative embodiment shown in FIGS. 1A and 1B shows that the protectable/aggregated content 106 is located on a content owner's digital data processing device 132, those skilled in the art will recognize that such content can be located within a repository 118 associated with a digital data processing device 120 of the license authority 108, a repository (not shown) associated with a digital data processing device (not shown) of a third-party validating entity 134, and/or in any other type of storage media communicatively coupled to the software processes of the license authority 108. Further, one or more aspects of the product/license identification software process 126 (and/or one or more aspects of other software processes of the license authority 108) and/or associated algorithm types 130 (e.g., hash algorithms 128) can be performed on digital data processing devices that are different from that of the license authority 108 such as, for example, on a content owner's digital data processing device 132, on a digital data processing device associated with a third-party validating entity 134, and/or on any other digital data processing device communicatively coupled to the digital data processing device 120 of the license authority 108.

Prior to, concurrently, or following the computation of a content identifier 112 for a particular protectable/aggregated content of interest 106, a content owner 102 and/or a third-party validating entity 134 can access a license evaluation software process 136 of the license authority 108 to evaluate one or more licenses 104 associated with a particular protectable/aggregated content of interest 106 to determine relevant subsets of known license attributes 138 that may be assigned/associated to represent such licenses 104 in one or more license profiles 114 (204). Known license attributes 138 can, for example, represent types of license restrictions that may occur in licenses that affect transactions in one or more industries (e.g., music industry, software industry, etc.) and/or operational environments. The license evaluation software process 136 can identify relevant subsets of the known license attributes 138 by, for example, mapping restrictions contained within license terms in the licenses 104 to particular known license attributes, evaluating information provided by a content owner 102, evaluating information provided by a third-party validating entity, and/or based on information provided by any other authorized entity and/or software process. Once the relevant subsets of the known license attributes 138 have been identified and assigned to represent the licenses 104 of the protectable/aggregated content 106, the license evaluation software process 136 can further analyze the licenses 104 to assign one or more restriction values 140 (specifying an applicability of an associated attribute), use values 142 (specifying a permissible degree of distribution that may cause an associated attribute to become applicable), interaction values 144 (specifying a permissible degree of manipulation that may be associated with a particular attribute), and/or other values (e.g., license text excerpts and/or other license identifying information associated with an attribute) to one or more of the assigned attributes 116 and these attributes and attribute values can be stored in one or more license profiles 114 in a repository 118 accessible by one or more digital data processing devices 120, 132, which may facilitate future processing activity within the licensing authority architecture 108 if and/or when such licenses 104 are encountered again. Although the assigned attributes 116 in the FIG. 1B embodiment indicate that corresponding restriction, use, and interaction values 140-144 are assigned to each of the attributes 116, those skilled in the art will recognize that one or more of such values 140-144, separately or in any combination, need not be assigned to any particular attribute 116 and that the illustrated embodiment is merely exemplary of one possible embodiment and is not intended to be limiting in any respect. Further, the licenses 104 of one or more protectable content elements 106 can include license terms that specify default distribution and/or manipulation restrictions that may be represented as common use and/or interaction values for at least some of the attributes 116 of corresponding license profiles 114, although the disclosed technology can also accommodate particular use and/or interaction values that may override such common/default values as required. In one illustrative embodiment, default restrictions in license terms can be represented as use, interaction, and/or other types of values that can be shared among license attributes 116 by, for example, assigning such default values to corresponding attributes (that do not have any overriding values that supersede the default values), assigning pointers and/or other indicia to the corresponding attributes so that default values can be referenced and taken into account during subsequent processing activities, and/or via any other method or mechanism which provides access to such default values during processing activities performed by one or more software processes of the license authority 108.

In an embodiment in which a license 104 for a particular protectable/aggregated content of interest 106 does not exist, has not been identified, and/or is not accessible by one or more of the software processes of the license authority 108, the content owner 102 and/or third-party validating entity 134 can instruct a content analysis software process 146 to analyze the protectable/aggregated content of interest 106 to identify an applicable license 104 and/or license profile 114 thereof (if such license profile already exists). The content analysis software process 146 can, for example, search for particular character strings (e.g., segments of software code), embedded copyright information, embedded license information, embedded ownership information, embedded version information, and/or any other type of indicia useful in identifying a license 104 of a protectable/aggregated content of interest 106. Once the content analysis software process 146 has identified the license 104, the license evaluation software process 136 can form a corresponding license profile 114 as previously described, if such license profile 114 does not already exist.

In one illustrative embodiment, a content owner 102 may seek to register an aggregated content 106 that includes two or more constituent protectable content elements with the license authority 108 in which case, the license evaluation software process 136 can evaluate the terms in an aggregated license 104 to form an aggregated license profile 114, as discussed above (assuming that such aggregated license 104 exists). However in embodiments where an aggregated license does not exist and/or is not accessible, the license evaluation software process 136 can form license profiles 114 representing licenses of the aggregated content's constituent protectable content elements and a license aggregation software process 148 of the license authority 108 can analyze the attributes and attribute values of such constituent license profiles to determine specific attribute and attribute value compatibilities and/or incompatibilities that can be used to form an aggregated license profile and/or aggregated license for the aggregated content of interest.

In one illustrative embodiment, a license aggregation software process 148 can compare attribute values associated with one or more license attributes of a first license with one or more corresponding attribute values associated with one or more license attributes of a second license to identify aggregated license attributes associated with an aggregated content of interest. Attributes and attribute values of the first license can be compared with corresponding attributes and attribute values of the second license in an attribute-by-attribute and/or attribute value-by-attribute value manner to ensure that any compatibilities and/or incompatibilities that may be associated with the combination of protectable content elements to form an aggregated content, targeted for deployment/operation in a particular manner/environment, are identified at a level of granularity sufficient to reliably detect potential/actual infringement risks associated with particular aspects of the aggregated content. Similarly, the attribute-by-attribute and/or attribute value-by-attribute value comparison can serve as a basis for determining whether particular aspects of the aggregated content are governed by the attributes/license terms of the first license, the attributes/license terms of the second license, and/or any combinations (e.g., one or more of the attributes and/or attribute values of the first license may govern an aspect of the aggregated content, while one or more of the attributes and/or attribute values of the second license may govern a different aspect of the aggregated content) and/or hybrids thereof (e.g., attribute values associated with an attribute of the first license and attribute values associated with an attribute of the second license may be assigned to a common attribute of the aggregated content and thus coexist as further discussed below, one or more attribute values associated with an attribute of the first license may override attribute values associated with an attribute of the second license in some situations or be overridden thereby in other situations, etc.). Those skilled in the art will recognize that this type of analysis can be performed for any number of attributes, attribute values, and/or licenses and that the disclosed embodiments are merely illustrative and are not intended to be limiting in any respect.

In one embodiment, the restriction, use, and/or interaction values assigned to an attribute of a first license may coexist with one or more of the restriction, use, and/or interaction values assigned to an attribute of a second license, if such values do not result in a dominant or subservient relationship that would necessitate a modification in the attribute values of a corresponding aggregated license attribute. For example, one or more coexisting values and/or value sets for a first attribute of an aggregated content may reflect optional occurrences within an operational/deployment environment, such as when, for example, license fees are forbidden when the aggregated content is used for research and development purposes, but fees are required when the aggregated content is widely distributed. In this manner, the disclosed technology can be used to generate one or more aggregated license alternatives, based on attributes whose values may accommodate a diverse spectrum of occurrences within one or more operational/deployment environments. Those skilled in the art will recognize that multiple values and/or value sets can be assigned to a wide variety of different attribute types and that the disclosed examples and embodiments are merely illustrative and are not intended to be limiting in any respect.

In one embodiment, one or more restriction, use, and/or interaction values assigned to an attribute of a first license may dominate or be subservient to one or more restriction, use, and/or interaction values assigned to an attribute of a second license, which may necessitate that attribute values of a corresponding aggregated license attribute reflect a combination of attribute values associated with the corresponding attributes of the first and second license (which may occur if there is partial domination or subservience) or reflect one set of attribute values in the case where there is complete domination or subservience. For example, a restriction value of an attribute associated with a first license may be more restrictive (e.g., recite a requirement or prohibition of the associated attribute) than a restriction value of an attribute associated with a second license (e.g., when a neutral/don't care value is specified) in which case, the restriction value of the first license governs the combination of such values and is thus represented as a restriction value to a corresponding attribute of an aggregated content. Similarly, use and/or interaction values of an attribute associated with a first license may also be more or less restrictive than use and/or interaction values of an attribute associated with a second license and the selection of the controlling values for the corresponding attribute of the aggregated content can be based, at least partly, on the relative restrictiveness of such values. A more detailed description of the functionality provided by the license evaluation software process 136 and license aggregation software process 148 can be found in U.S. Pat. No. 7,552,093, entitled "Resolving License Dependencies for Aggregations of Legally-Protectable Content," the entirety of which is incorporated herein by reference.

With continuing reference to FIGS. 1A, 1B, and 2, a content owner 102 can convey a protectable/aggregated content of interest 106, a corresponding content identifier 112, a corresponding license 104, and/or a corresponding license profile 114 to a third-party validating entity 134 by, for example, including one or more of such elements 106, 112, 104, 114 in a validation request message 150 (which may be encrypted and digitally signed) that is transmitted to the third-party validating entity 134 directly or via a network 152. Alternatively, the validation request message 150 can provide information (e.g., user identifier and/or password) to the third-party validating entity 134, which enables such entity 134 to access the protectable/aggregated content of interest 106, the corresponding content identifier 112, the corresponding license 104, and/or the corresponding license profile 114 (e.g., via a secure web site).

In response to receiving the validation request message 150, the third-party validating entity 134, which may (but need not) be associated with the license authority 108, can access one or more of the product/license identification, content analysis, license evaluation, and/or license aggregation software processes 126, 146, 136, 148 that may be operating locally and/or on the digital data processing device 120 of the license authority 108 and apply one or more of such processes 126, 146, 136, 148 to one or more of the protectable/aggregated content of interest 106, the corresponding content identifier 112, the corresponding license 104, and/or the corresponding license profile 114 to form a validated content identifier and/or validated license profile (206). The validated content identifier and/or validated license profile can be compared with corresponding content identifiers and/or corresponding license profiles formed by the content owner 102 (if any such identifiers or profiles were computed by the content owner) to identify errors and/or inconsistencies therein. The validated content identifier, validated license profile, identifier 154 of the content owner 102, identifier 154 of the third-party validating entity, and/or other related data/information (e.g., the protectable/aggregated content 106, license 104, etc.) can be incorporated into a registration request message 154 (e.g., an electronic mail message, an electronic file, a stream of digital data packets, etc.) that may be encrypted, digitally signed, and transmitted to a request handling software process 156 of the license authority 108 via the network 152 for registration (208).

As previously described, the particular mechanism used to generate and convey a content identifier 112 and/or license profile 114 to a license authority 108 can determine a measure of risk 158 that may affect one or more provisions in an insurance contract, which insures interested parties from unwittingly infringing a content owner's rights in a protectable/aggregated content 106. For example, a relatively low measure of risk 158 may be obtained when a third-party validating entity 134 employs product/license identification, content analysis, license evaluation, and/or license aggregation software processes 126, 146, 136, 148 to form the content identifier 112 and/or license profile 114 for a particular protectable/aggregated content 106 as compared with a relatively high measure of risk 158 that may be obtained when a content owner does not use a third-party validating entity 134 or the software processes 126, 146, 136, 148 of the license authority 108.

Upon receipt of a registration request message 154 from a content owner 102 or third-party validating entity 134, a request handling software process 156 can decrypt, parse, and/or otherwise process the message 154 to access the content identifier 112 associated with a protectable/aggregated content of interest 106, the license profile 114 representing a license 104 associated with the protectable/aggregated content of interest 106, the identifier 154 identifying the content owner 102, and/or any other information that may be contained therein (e.g., protectable/aggregated content 106, license 104, identifier 154 of the third-party validating entity, indicia pertaining to the mechanism/procedure used to form the content identifier 112 and/or license profile 114, etc.) (210). The request handling software process 156 can analyze the format (e.g., number of digits, alphanumeric sequences, etc.) of the content identifier 112 to identify the particular algorithm type 130 used to form such content identifier 112 (212). The request handling software process 156 can further instruct a product/license identification software process 126 to compute a license identifier 122 that substantially uniquely identifies the license 104 of the protectable/aggregated content of interest 106 by applying, for example, one or more algorithm types 130 (e.g., hash algorithms 128) to the content identifier 112, license profile 114, owner/validator identifier 154, and/or algorithm type 130 used to form the content identifier 112 (214). The request handling software process 156 can store the computed license identifier 122, content identifier 112, identified algorithm type 130, license profile, owner/validator identifier, protectable/aggregated content 106, license 104, and/or other related information in one or more repositories 118 communicatively coupled to the digital data processing device 120 of the license authority 108 and can associate such elements in one or more data structures (not shown) to effectuate registration of the license 104 and/or protectable/aggregated content 106.

Once the license 104 and/or protectable/aggregated content are registered, the request handling software process can form a reply message that transmits the resulting computed license identifier 122 to the content owner 102 (216). The content owner 102 can electronically distribute (e.g., incorporate into an email message, make available on a web site, etc.) and/or otherwise convey (e.g., mail a CD, DVD, floppy disk, and/or other media) the computed license identifier 122, the associated protectable/aggregated content 106, the associated license 104, and/or other data/information to one or more content users 110 (218). In one embodiment, the computed license identifier 122 can correspond to a code that enables the protectable/aggregated content 106 to partially or fully operate. Upon receipt of the information transmitted from the content owner 102, the content user 110 may want to confirm that such information is authentic and has not been tampered with and/or otherwise manipulated by unauthorized parties. Accordingly, the content user 110 can instruct one or more software processes (not shown) executing on a digital data processing device 160 accessible to the content user 110, such as processes associated with a web browser software application, to form and transmit an authenticity request message 162 that may be encrypted and digitally signed and which includes a license identifier 124 received from the content owner 102 to the request handling software process 156 of the license authority 108 (220).

Upon receipt of the authenticity request message 154, the request handling software process 156 can decrypt and/or otherwise manipulate the message 154 to access the license identifier 124 transmitted by the content user 110. The request handling software process 156 can instruct a risk assessment software process 164 to authenticate the received license identifier 124 by, for example, comparing the received license identifier 124 with the computed license identifier 122 that was previously formed and transmitted by the software processes of the license authority 108 to the content owner 102 to confirm that the license identifiers 124, 122 are substantially equivalent (222). If the license identifiers 122, 124 are not substantially equivalent, then the request handling software process 156 can form and transmit a reply message to the content user 110 that the license identifier 124 received from the content owner 102 by the content user 110 has failed authentication. If the risk assessment software process 164 determines that the license identifiers 122, 124 are substantially equivalent, the process 164 can form authenticity indicia 166 (e.g., one or more risk measures 158) that can be transmitted to and/or otherwise accessed by the content user 110 (224).

Authenticity indicia 166 can be interpreted to inform the content user 110 of a risk of infringing a content owner's rights in a protectable/aggregated content of interest 106 that may be based on, for example, a content owner's authority to license the content of interest 106 (e.g., whether the content owner 102 has full or partial rights to license the content 106 and/or whether the rights of other content owners may be infringed), a tampering and/or other unauthorized manipulation of the content 106 and/or associated license 104 (e.g., whether unauthorized entities have improperly modified, copied, distributed, and/or otherwise manipulated the content 106, whether entities are perpetrating a fraud on the content user 110 by feigning a lawful interest in the content 106, etc.), and/or on any other bases that expose a content user 110 to a risk of infringing a content owner's rights in a content of interest 106. Authenticity indicia 166 can include, for example, one or more of the following, separately or in any combination, a validated/authenticated content identifier 112, a validated/authenticated protectable/aggregated content 106, a validated/authenticated license 104, a validated/authenticated license profile, and/or one or more risk measures 158. Authenticity indicia 166 that has been validated and/or authenticated can indicate to the content user 110 that the license authority has authenticated the validity of such indicia and/or associated content 104 and/or data and has a particular confidence in the accuracy and reliability of such content/data, as expressed in one or more of the risk measures 158.

Risk measures 158 can be computed by the risk assessment software process 164 based on, for example, numerical weights that can be associated with the type of entities involved in the formation of the content identifier 112 and license profile 114 of a protectable/aggregated content of interest 106. For example, greater numerical weights can be applied to content identifiers 112 and license profiles 114 that are formed by automated software processes 126, 146, 136, 148 and independent, third-party validating entities 134 than to content identifiers 112 and license profiles 114 that are formed by a content owner 102 and without having the benefit of one or more automated processes 126, 146, 136, 148 and/or validating entities 134. The relatively greater numerical weights encountered by using automated processes 126, 146, 136, 148 and independent third-party validating entities 134 can correspond to a relatively higher confidence level (relatively low risk level) that a license 104 of a protectable/aggregated content 106 is accurate and reliable and may thus present little, if any, risk of infringing a content owner's rights in a content of interest 106. Similarly, relatively smaller numerical weights encountered when automated processes 126, 146, 136, 148 and/or validating entities 134 are not used can correspond to a relatively lower confidence level (relatively high risk level) that a license 104 of the protectable/aggregated content 106 is accurate and reliable and may thus present a significant and quantifiable infringement risk. Risk measures 158 that are computed from such exemplary numerical weights can be incorporated into one or more actuarial tables that can form the basis for one or more provisions of an insurance contract targeted at insuring against potential infringement. Accordingly, content users 110, content distributors, content aggregators, insurance carriers, and/or other interested entities can use such risk measures 158 to formulate a liability insurance contract, negotiate better license terms with content owners 102, increase an end-user price of such content 106, and/or otherwise mitigate potential legal and/or financial liability prior to using and/or otherwise interacting with the content 106.

In one illustrative embodiment, a measure of risk 158 that may form an entry in an actuarial risk table can be determined from an equation whose variables are based on an accuracy/reliability of a license profile 114 and/or on an association/correlation between a license profile 114 and a particular protectable/aggregated content of interest 106. These variables can lie within a continuum, from a relatively low accuracy/correlation to a relatively high accuracy/correlation. For example, a variable based on an accuracy of a license profile 114 can exhibit increasing values as the accuracy of the license profile 114 increases in the following exemplary continuum (from low to high accuracy): a) a license profile 114 is not formed for a protectable content of interest 106, b) a license profile 114 is partially formed for a protectable content of interest 106 by a content owner 102 of such content 106, c) a license profile 114 is fully formed for a protectable content of interest 106 by a content owner 102 of such content 106, d) an aggregated license profile 114 is fully formed by an aggregated content owner for an aggregated content of interest that includes two or more constituent protectable content elements, e) an aggregated license profile 114 is fully formed by analyzing a relatively high level portion of an aggregated content of interest using one or more automated software processes 126, 146, 136, 148, f) an aggregated license profile 114 is fully formed by comprehensively analyzing an aggregated content of interest, including an analysis of its constituent protectable content elements, using one or more automated software processes 126, 146, 136, 148, g) an aggregated license profile 114 is fully formed by comprehensively analyzing an aggregated content of interest, including an analysis of its constituent protectable content elements, using one or more automated software processes 126, 146, 136, 148 and where license profiles of the constituent protectable content elements are validated by a third-party validating entity 134, h) same as prior element, except also validate the aggregated license profile 114 using the third-party validating entity 134, and i) same as prior element, except also have the third-party validating entity 134 form the aggregated and constituent license profiles using the automated software processes 126, 146, 136, 148. Similarly, a variable based on a correlation between a license profile 114 and its associated protectable/aggregated content 106 can exhibit increasing values as the correlation between such profile 114 and content 106 increases in the following exemplary continuum (from low to high correlation): a) there is no correlation between a license profile 114 and a particular protectable/aggregated content of interest 106, b) a content owner 102 of a protectable/aggregated content 106 specifies that the content 106 and associated profile 114 are correlated, c) a content owner 102 of a protectable/aggregated content 106 specifies that the content 106 and associated profile 114 are correlated and the identity of such content owner 102 is verified by an independent third-party entity (e.g., a third-party validating entity 134, a digital certificate authority, a license authority 108, etc.), d) same as prior element, except also submit the protectable/aggregated content 106 and associated profile 114 to the independent third-party entity, which can subsequently confirm the identity of the submitted content 106 and profile 114 (by, for example, issuing a digital certificate indicative of such confirmed identity), and e) same as prior element, except also have the independent third-party entity analyze the contents of the protectable/aggregated content 106 relative to the associated profile 114 to confirm/verify a correlation between such content 106 and profile 114 (by, for example, issuing a digital certificate indicative of such confirmed/verified correlation).

Although the disclosed technology has been described with reference to specific embodiments, it is not intended that such details should be regarded as limitations upon the scope of the invention, except as and to the extent that they are included in the accompanying claims.

What is claimed is:

1. A method for facilitating deployment of aggregated protectable content in an environment comprising:
    receiving, by a license authority device, a registration request message including at least a content ID, a license profile, and an owner ID from a content owner device;
    accessing, by the license authority device, the content ID, the license profile, and the owner ID from the received registration message;
    identifying, by the license authority device, an algorithm type used in forming the content ID;
    computing, by the license authority device, a license identifier of an aggregated protectable content based on the content ID, the license profile, the owner ID, and the algorithm type;
    storing, by the license authority device, the identified algorithm type, the computed license identifier, the content ID, the license profile, and the owner ID in one or more repositories;
    transmitting, by the license authority device, the computed license identifier to the content owner device;
    receiving, by the license authority device, a request message comprising a second license identifier from a content user device;
    retrieving, by the license authority device, the computed license identifier from the one or more repositories;
    comparing, by the license authority device, the second license identifier with the retrieved computed license identifier; and
    providing, by the license authority device, an authenticity information of the second license identifier to the content user device based on the step of comparing.

2. The method of claim 1, wherein the aggregated protectable content is compliant with an open source definition.

3. The method of claim 1, wherein the algorithm type is a hash algorithm.

4. The method of claim 1, wherein the license identifier is associated with at least one restriction value that specifies particular restrictions of the aggregated protectable content.

5. The method of claim 4, wherein the at least one restriction value corresponds to at least one of a prohibition, a requirement, and a nullity.

6. The method of claim 4, wherein the at least one restriction value includes at least one of values including true, false, required, don't care, forbidden, 1, 0, −1, and text.

7. The method of claim 1, wherein the license identifier is associated with at least one use value that specifies a permissible degree of distribution of the aggregated protectable content.

8. The method of claim 7, wherein the at least one use value corresponds to at least one of an acquisition, a personal use, a research use, an organizational use, a limited distribution, and an unlimited distribution of the aggregated protectable content.

9. The method of claim 1, wherein the license identifier is associated with at least one interaction value that specifies a permissible degree of manipulation of the aggregated protectable content.

10. The method of claim 9, wherein the at least one interaction value corresponds to at least one of an original element, a modified element, a group of distinct elements, a group of interconnected elements, a group of elements capable of providing a desired functionality, a plurality of interoperable groups of elements capable of providing a plurality of functions, an unrestricted manipulation of elements, and an unrestricted ownership of elements of at least one aspect of the protectable content.

11. The method of claim 1, wherein the license authority device is an independent third party entity device.

12. The method of claim 1, further comprising determining a risk measure indicating a level of confidence that the license profile is authentic.

13. The method of claim 12, wherein the risk measure comprises one of high risk, moderate risk, and low risk.

14. A system for facilitating deployment of aggregated protectable content, the system comprising:
    one or more processors; and
    memory storing computer executable instructions that, when executed by the one or more processors, cause the one or more processors to perform the operation of:
    receiving a registration request message including at least a content ID, a license profile, and an owner ID from a content owner device;
    accessing the content ID, the license profile, and the owner ID from the received registration message;
    identifying an algorithm type used in forming the content ID;
    computing a license identifier of an aggregated protectable content based on the content ID, the license profile, the owner ID, and the algorithm type;
    storing the identified algorithm type, the computed license identifier, the content ID, the license profile, and the owner ID in one or more repositories;
    transmitting the computed license identifier to the content owner device;
    receiving a request message comprising a second license identifier from a content user device;
    retrieving the computed license identifier from the one or more repositories;
    comparing the second license identifier with the retrieved computed license identifier; and
    providing an authenticity information of the second license identifier to the content user device based on the comparison.

15. The system of claim 14, wherein the aggregated protectable content is compliant with an open source definition.

16. The system of claim 14, wherein the license identifier is associated with at least one restriction value that specifies particular restrictions of the aggregated protectable content.

17. The system of claim 16, wherein the at least one restriction value corresponds to at least one of a prohibition, a requirement, and a nullity.

18. The system of claim 14, wherein the license identifier is associated with at least one use value that specifies a permissible degree of distribution of the aggregated protectable content.

19. The system of claim 18, wherein the at least one use value corresponds to at least one of an acquisition, a personal use, a research use, an organizational use, a limited distribution, and an unlimited distribution of the aggregated protectable content.

20. The system of claim 14, wherein the license identifier is associated with at least one interaction value that specifies a permissible degree of manipulation of the aggregated protectable content, wherein the at least one interaction value corresponds to at least one of an original element, a modified element, a group of distinct elements, a group of interconnected elements, a group of elements capable of providing a desired functionality, a plurality of interoperable groups of elements capable of providing a plurality of functions, an unrestricted manipulation of elements, and an unrestricted ownership of elements of at least one aspect of the protectable content.

\* \* \* \* \*